United States Patent
Wu

(10) Patent No.: US 9,282,697 B2
(45) Date of Patent: Mar. 15, 2016

(54) GARDEN SHEARS

(75) Inventor: Shih-Piao Wu, Lu Kang Town (TW)

(73) Assignee: Jiin Haur Industrial Co. Ltd., Changhua (TW)

(*) Notice: Subject to any disclaimer, the term of this patent is extended or adjusted under 35 U.S.C. 154(b) by 1043 days.

(21) Appl. No.: 12/785,483

(22) Filed: May 23, 2010

(65) Prior Publication Data

US 2011/0283545 A1    Nov. 24, 2011

(51) Int. Cl.
*A01G 3/02* (2006.01)
*B26B 13/22* (2006.01)
*B26B 13/26* (2006.01)
*B26B 17/00* (2006.01)
*B26B 17/02* (2006.01)

(52) U.S. Cl.
CPC *A01G 3/02* (2013.01); *A01G 3/021* (2013.01); *B26B 13/22* (2013.01); *B26B 13/26* (2013.01); *B26B 17/00* (2013.01); *B26B 17/02* (2013.01)

(58) Field of Classification Search
CPC ....... A01G 3/02; A01G 3/0251; A01G 3/021; A01G 3/025; A01G 3/065; B23D 21/06; B23D 21/10; B26B 13/22; B26B 13/26; B26B 13/285; B26B 17/00; B26B 17/02; B26D 3/169; B29L 2031/283
USPC .............. 30/254, 258, 92, 191–193, 250–252
IPC ............................................ A01G 3/02, 3/0251
See application file for complete search history.

(56) References Cited

U.S. PATENT DOCUMENTS

| | | | | |
|---|---|---|---|---|
| 2,574,354 A | * | 11/1951 | Smith | 30/186 |
| 3,390,455 A | * | 7/1968 | Florian | B23D 29/026 30/190 |
| 4,084,317 A | * | 4/1978 | Nakamura | B26B 13/26 30/251 |
| 4,094,064 A | * | 6/1978 | Nishikawa et al. | 30/92 |
| 4,176,450 A | * | 12/1979 | Muromoto | 30/92 |
| RE30,613 E | * | 5/1981 | Nakamura | B26B 13/16 30/190 |
| 4,674,184 A | * | 6/1987 | Anderson | 30/92 |
| 5,511,314 A | * | 4/1996 | Huang | 30/251 |
| 6,305,087 B1 | * | 10/2001 | Huang | 30/250 |
| 6,640,441 B1 | * | 11/2003 | Huang | 30/233 |
| 6,640,442 B2 | * | 11/2003 | Lin | 30/251 |
| 6,671,967 B1 | * | 1/2004 | Huang | 30/258 |

(Continued)

FOREIGN PATENT DOCUMENTS

| | | |
|---|---|---|
| DE | 197 12 170 A1 | * 11/1997 |
| DE | 200 02 779 U1 | * 5/2000 |

*Primary Examiner* — Clark F Dexter
(74) *Attorney, Agent, or Firm* — Che-Yang Chen; Law Office of Michael Chen

(57) ABSTRACT

A pressing handle member of garden shears has two symmetric pressing handle elements sandwiching a separator. The separator and the pressing handle elements each respectively have a shaft aperture and a first pivot aperture. The separator has an anvil. A blade member is inserted in a first slot of the separator and pivoted onto a bolt that is disposed through the shaft aperture. Two connecting members are slidably coupled to an adjusting slot in the blade member. The gripping member has two symmetric handle elements sandwiching an assembly member. Each handle element has a second pivot aperture; a pin is placed through the second pivot apertures and the first pivot apertures of the pressing handle member. The gripping member also has a second through aperture and a joint is placed through the second through aperture and the connecting apertures of the connecting members.

9 Claims, 7 Drawing Sheets

(56) References Cited

U.S. PATENT DOCUMENTS

| | | | |
|---|---|---|---|
| 7,127,819 B1 * | 10/2006 | Huang | 30/92 |
| 7,328,513 B1 * | 2/2008 | Yang | B26B 17/02 30/178 |
| 7,716,840 B2 * | 5/2010 | Nandkumar | B26D 3/169 |
| 8,327,548 B2 * | 12/2012 | Ronan | 30/238 30/175 |
| 8,458,912 B2 * | 6/2013 | Linden | A01G 3/02 30/131 |
| 2003/0136008 A1 * | 7/2003 | Lin | A01G 3/0251 30/250 |

* cited by examiner

_GARDEN SHEARS_

GARDEN SHEARS

BACKGROUND OF THE INVENTION

1. Field of the Invention

The present invention relates to garden shears, and more particularly to garden shears that are capable of preventing cutting stress focusing on a single pivot to improve cutting efficiency and reduce cutting-induced exhaustion.

2. Description of the Related Art

Currently, the typical cutting shears structure has two members pivoted together which respectively have two handles at one end and two symmetric blades facing each other placed at the opposite ends. When the handles are pressed together, the blades are capable of shearing an object between the blades. However, when using typical cutting shears for the trimming of plants, it is common to add an anvil at one end of the blade to improve the cutting efficiency of the garden shears, which can not only increase cutting strength but also provides a stronger gripping strength. However, in order to ensure strong structural strength, the blade and the handle both need to be heavy, which causes inconvenience and leads to higher costs. Further, the shears only have one pivot connection which causes cutting stresses to concentrate at the pivot connection.

Therefore, it is desirable to provide garden shears to mitigate and/or obviate the aforementioned problems.

SUMMARY OF THE INVENTION

An objective of the present invention is to provide garden shears.

In order to achieve the above-mentioned objectives, the garden shears of the present invention comprises a pressing handle member, a blade member and a gripping member. The pressing handle member has two symmetric pressing handle elements sandwiching a separator. The separator and the pressing handle elements each respectively have a shaft aperture and a first pivot aperture at a middle section thereof. The separator has an anvil formed on one side of the first pivot aperture. A first slot is disposed in the separator and is spaced from the anvil towards the shaft aperture. Enforcing strips are provided on external side surfaces of the anvil by way of the pressing handle elements, which provide extra strength for the anvil. A limiting recess with a relatively larger diameter is formed on the shaft aperture in the separator, and a nut is disposed in the limiting recess and sandwiched between the separator and pressing handle element; a bolt passes through the shaft apertures and threads onto the nut. The blade member is inserted in the first slot of the separator and pivoted onto the bolt that is disposed through the shaft apertures of the pressing handle member by way of a first through aperture in the blade member. A blade is formed on the blade member and faces towards the anvil. An adjusting slot is formed in the blade member on a side of the through aperture opposite to that of the blade. Two connecting members are slidably coupled to the adjusting slot, and the adjusting slot has a sidewall with at least four undulating sections or portions, such that the connecting members are able to move along the undulating sidewall for positional adjustment. The gripping member has two symmetric handle elements sandwiching an assembly member. One end of each handle element has a second pivot aperture; a pin is placed through the second pivot apertures and the first pivot apertures of the pressing handle member. The gripping member also has a second through aperture disposed on an inner side of the gripping member with respect to the second pivot apertures and a joint is placed through the second through aperture and the connecting apertures of the connecting members.

With the above-mentioned structure, the following benefits can be obtained: 1. because the pressing handle member has the pressing handle elements sandwiching the separator and the blade member pivoted onto one end of the separator, and the gripping member uses the gripping handle elements sandwiching the assembly member, the pivot connection between the pressing handle member and the gripping member provides a cutting structure with greater structural strength. 2. The pressing handle member and the gripping member rotate around the first pivot apertures and the pressing handle member and the blade member rotate around the shaft apertures such that the cutting stress is not concentrated at a single pivot connection, which can improve the cutting efficiency and reduce the cutting-induced exhaustion.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
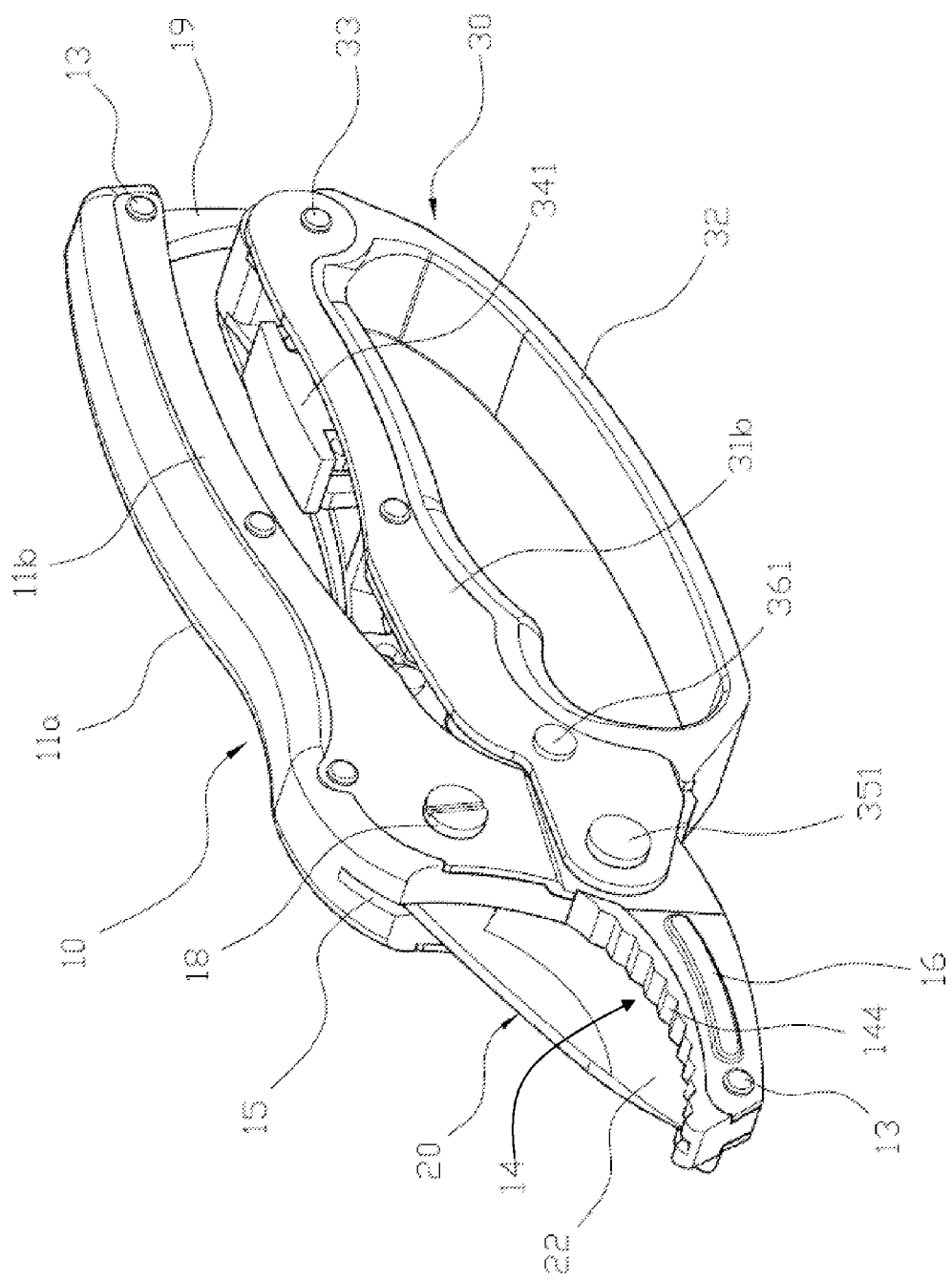
FIG. 1 is a perspective view of an embodiment of the present invention.
Figure 2:
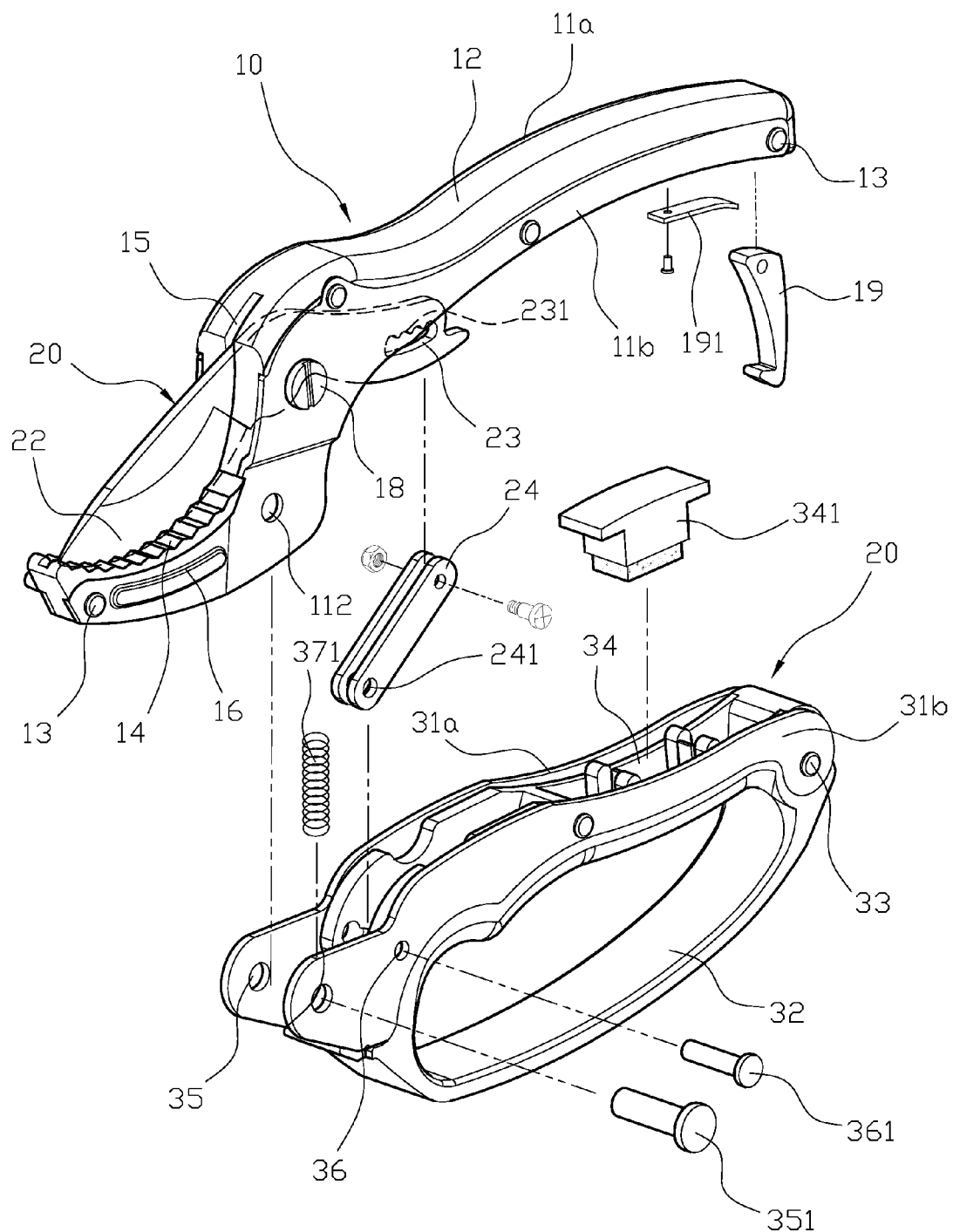
FIG. 2 is a first perspective exploded view of an embodiment of the present invention.
Figure 3:
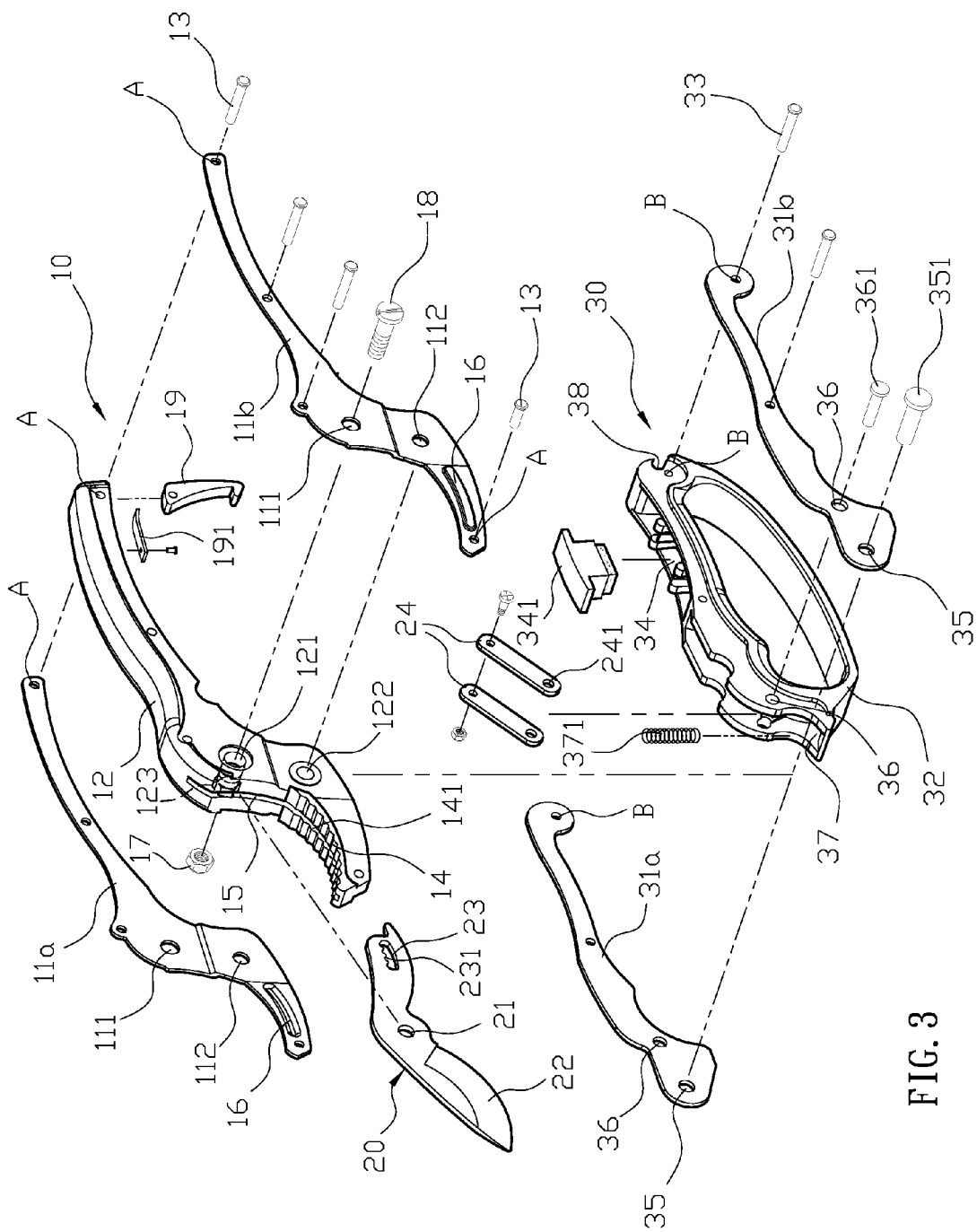
FIG. 3 is a second perspective exploded view of an embodiment of the present invention.

Please refer to FIG. 1, FIG. 2 and FIG. 3. A garden shears structure comprises a pressing handle member 10, a blade member 20 and a gripping member 30. The pressing handle member 10 has two symmetric pressing handle elements 11a, 11b sandwiching a separator 12. The pressing handle elements 11a, 11b and the separator 12 all have a plurality of assembly apertures A, and a plurality of the securing pins 13 that respectively pass through the assembly apertures A to sandwich the separator 12 between the two pressing handle elements 11a, 11b. The separator 12 is made of plastic or elastic materials, such as rubber. The separator 12 and the pressing handle elements 11a, 11b each respectively have a shaft aperture 111, 121 and a first pivot aperture 112, 122 at a middle section. The separator 12 has an anvil 14 formed on one side of the first pivot aperture 122. The anvil 14 has a toothed arced surface 144, and a cutting slot 141 is formed along a centerline of the arced surface 144. A first slot 15 is disposed in the separator 12 and extends from the anvil 14 towards the shaft aperture 121. Enforcing strips 16 are provided on external side surfaces of the anvil 14 by way of the pressing handle elements 11a, 11b, which provide extra strength for the anvil 14. A limiting recess 123 with a relatively larger diameter is formed on the shaft aperture 121 in the separator 12, and a nut 17 is disposed in the limiting recess 123 and sandwiched between the separator 12 and pressing handle element 11a; a bolt 18 passes through the shaft apertures 111, 121 and threads onto the nut 17. A blade member 20 is inserted in the first slot 15 of the separator 12 and pivoted onto the bolt 18 that is disposed through the shaft aperture 121 of the pressing handle member 10 by way of a first through aperture 21 in the blade member 20. A blade 22 is formed on the blade member 20 and faces towards the anvil 14. An adjusting slot 23 is formed in the blade member 20 on a side of the through aperture 21 opposite to that of the blade 22. Two connecting members 24 are slidably coupled to the adjusting slot 23, and the adjusting slot 23 has a sidewall 231 with at least four undulating sections or portions, such that the connecting members 24 are able to move along the undulating sidewall 231 for positional adjustment. A connecting aperture 241 is formed at one end of each connecting member 24. The gripping member 30 has two symmetric gripping handle elements 31a, 31b sandwiching an assembly member 32, and the gripping handle elements 31a, 31b and the assembly member 32 all have a plurality of assembly apertures B; a plurality of the securing pins 33 respectively pass through the assembly apertures B. The assembly member 32 is made of plastic or elastic materials, such as rubber. The assembly member 32 further comprises a storage space 34 on a side facing the pressing handle member 10, and an oil applicator 341 is set in the storage space 34. One end of each of the gripping handle elements 31a, 31b has a second pivot aperture 35; a pin 351 is placed through the second pivot apertures 35 and the first pivot apertures 112, 122 of the pressing handle member 10. The gripping member 30 also has a second through aperture 36 that includes apertures through both gripping handle elements 31a, 31b and through the assembly member 32. The second through aperture 36 is disposed on an inner side of the gripping member 30 with respect to the second pivot apertures 35 and a joint 361 is placed through the second through aperture 36 and the connecting apertures 241 of the connecting members 24. The assembly member 32 further comprises a containment section 37 set immediately adjacent to the second through aperture 36, and an elastic body 371 is disposed in the containment section 37; the elastic body 371 pushes against the pressing handle member 10, sandwiching the elastic body 371 between the pressing handle member 10 and the gripping member 30. The pressing handle member 10 has an engaging member 19 pivoted onto one end of the separator 12. An elastic plate 191 is sandwiched between the separator 12 and the engaging member 19, and the gripping member 30 has an engaging portion 38 corresponding to the engaging member 19 such that the engaging member 19 keeps the blade 22 and the anvil 14 closed together.

Figure 4:
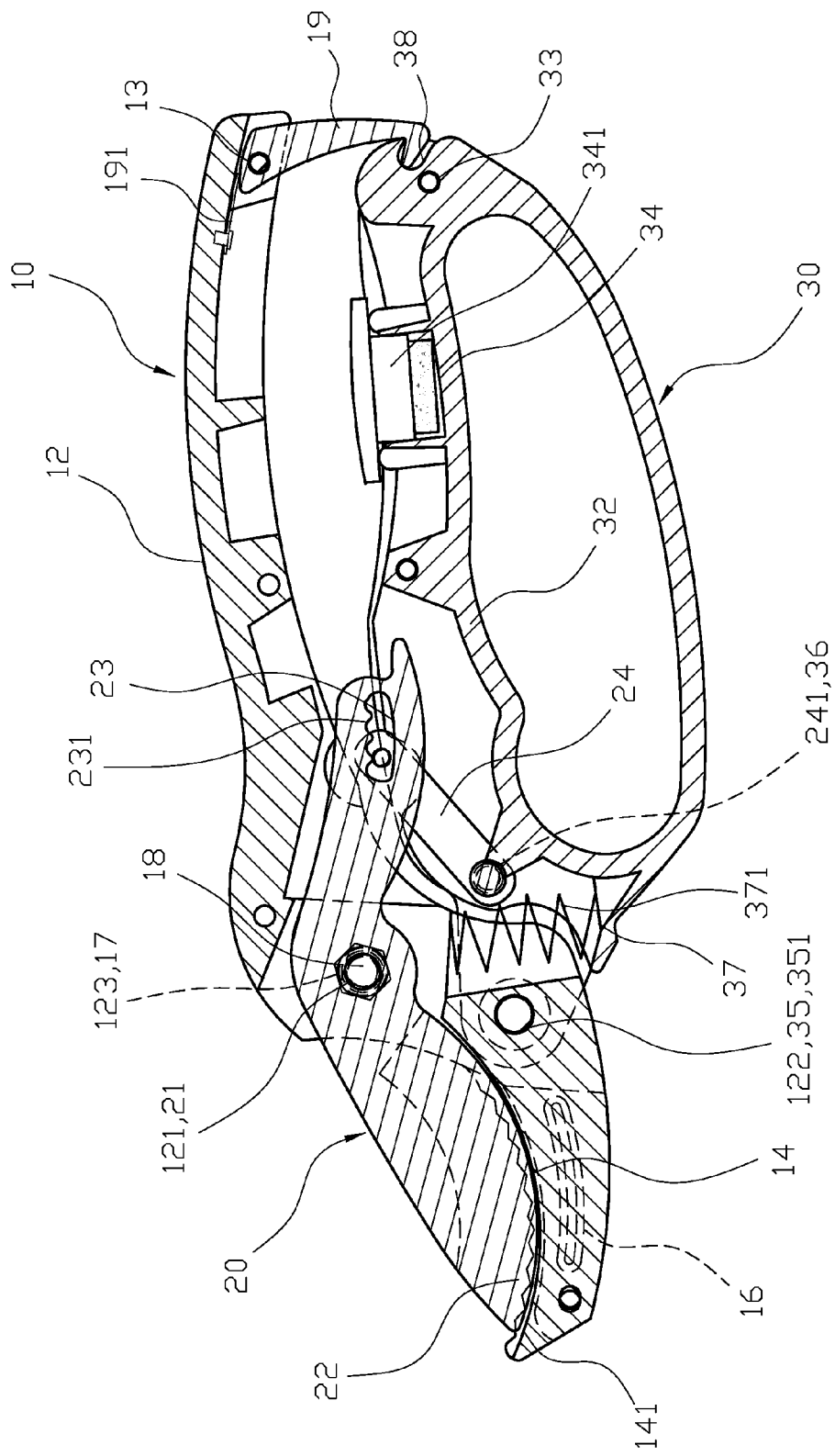
FIG. 4 is a cross-sectional view of an embodiment of the present invention.

Please refer to FIGS. 2, 3 and 4. The pressing handle member 10 has the nut 17 disposed in the limiting recess 123 and sandwiched against the separator 12, and the pressing handle elements 11a, 11b sandwich the separator 12 such that the shaft apertures 111, 121 of the pressing handle elements 11a, 11b and the first pivot apertures 112, 122 of the separator 12 are aligned. The plurality of securing pin 13 are placed through the assembly apertures A to assemble together the pressing handle elements 11a, 11b and the separator 12, and the securing pin 13 is also pivoted onto the engaging member 19. The elastic plate 191 is disposed between the engaging member 19 and the separator 12. When the end with the adjusting slot 23 of the blade member 20 is inserted into the first slot 15 of the separator 12, the first through aperture 21 is aligned with the shaft apertures 111, 121, and the blade 22 is accepted in the anvil 14. Then, the bolt 18 is placed through the shaft apertures 111, 121 and the first through aperture 21 and locked with the nut 17 set in the limiting slot 123 to provide a pivot connection for the blade member 20 and the pressing handle member 10. The two connecting members 24 are connected to the adjusting slot 23 of the blade member 20, which completes assembly of the pressing handle member 10. The gripping member 30 has the oil applicator 341 in the storage space 34 of the assembly member 32. The handle elements 31a, 31b sandwich the assembly member 32 and utilize the securing pin 33 passing through the assembly apertures B to secure the handle elements 31a, 31b and the assembly member 32 together, while the containment section 37 of the assembly member 32 holds the elastic body 371. The second pivot aperture 35 of the gripping member 30 is aligned with the first pivot apertures 112, 122 of the pressing handle member 10, and the pin 351 is placed through the second pivot aperture 35 and the first pivot apertures 112, 122 of the pressing handle member 10 to form a pivot connection between the pressing handle member 10 and the gripping member 30. One end of the elastic body 371 pushes against the separator 12 of the pressing handle member 10. The connecting apertures 241 of the connecting members 24 are aligned with the second through aperture 36 of the gripping member 30 and the securing pin 361 is placed through the connecting apertures 241 and the second through aperture 36 to respectively secure the two ends of the connecting members 24 to the blade member 20 and the handle member 30.

Figure 5:
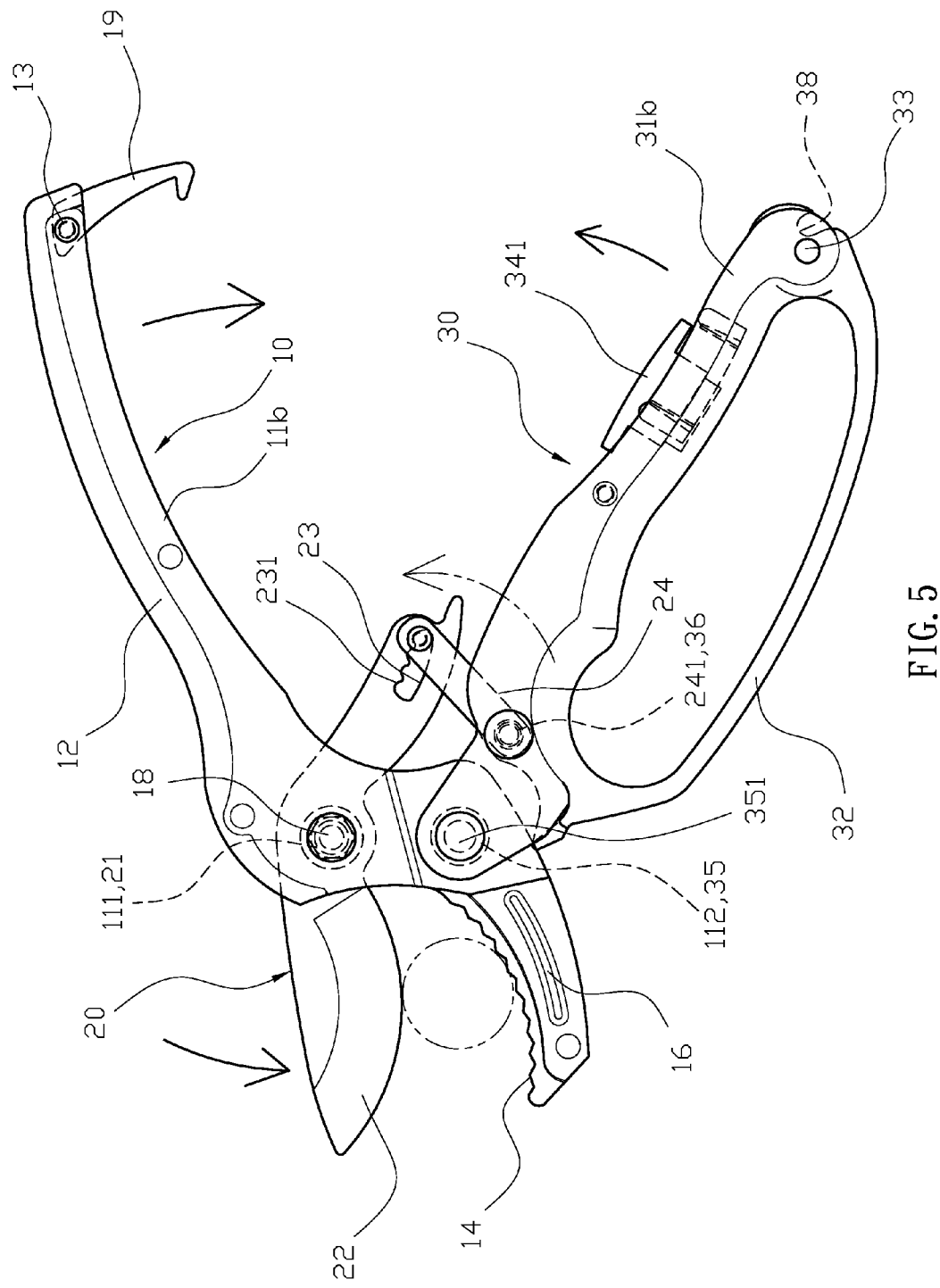
FIG. 5 is a first schematic drawing of a cutting movement according to an embodiment of the present invention.
Figure 6:
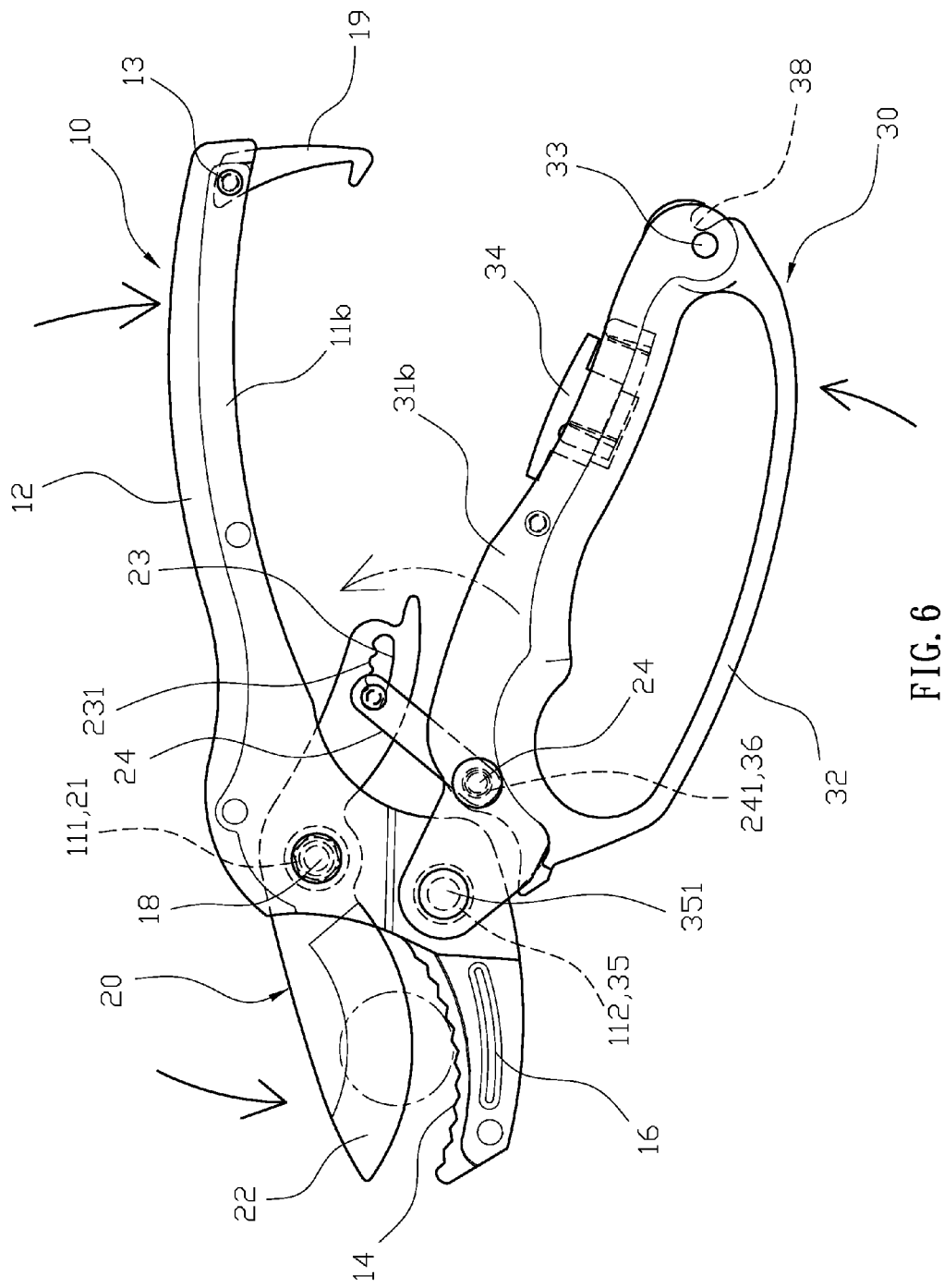
FIG. 6 is a second schematic drawing of a cutting movement according to an embodiment of the present invention.
Figure 7:
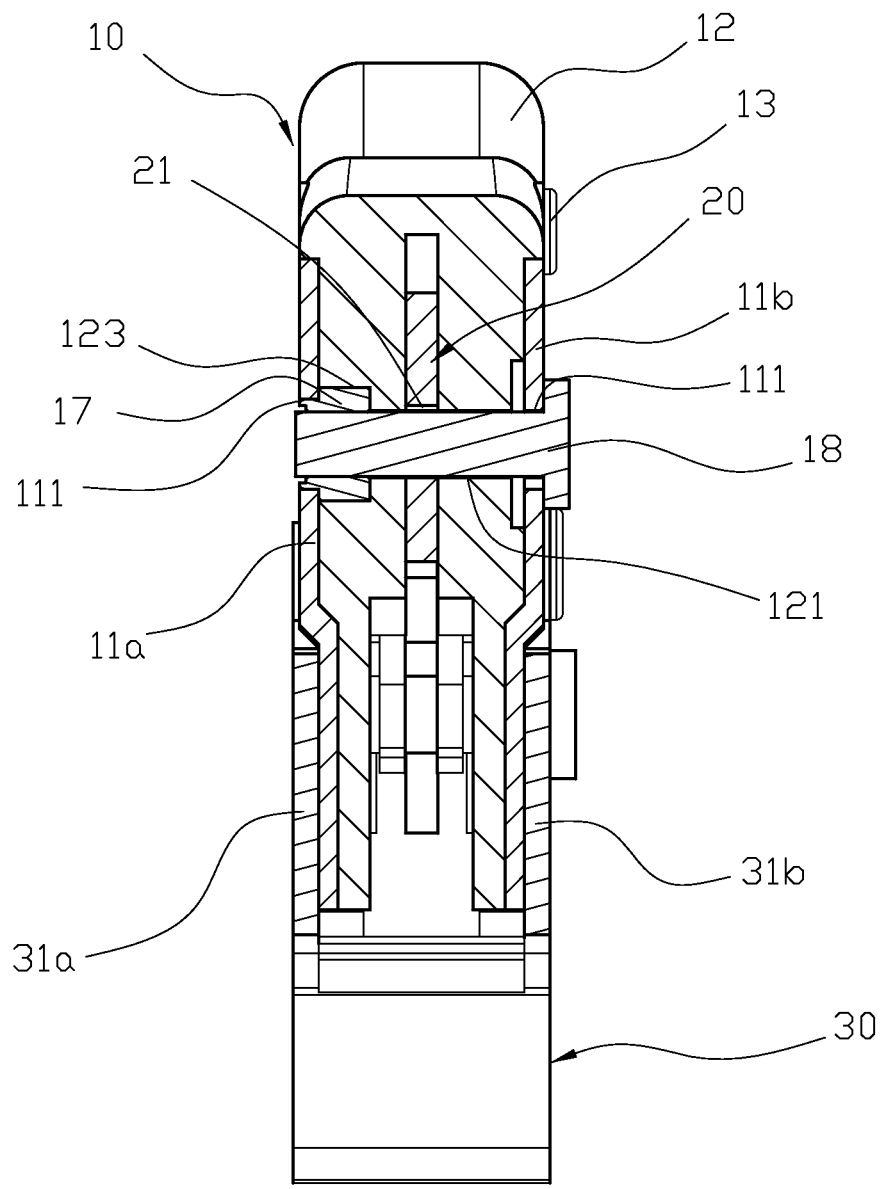
FIG. 7 is a cross-sectional view of a shaft aperture according to an embodiment of the present invention.

For actual usage, please refer to FIGS. 5, 6 and FIG. 2. The pressing handle member 10 and the gripping member 30 are able to rotate around the first pivot apertures 112, 122 and the second pivot aperture 35, when the pressing handle member 10 and the gripping member 30 are pressed together. When the gripping member 30 moves towards to the pressing handle member 10, the connecting members 24 limited by the second through aperture 36 are pushed along the same direction in the adjusting slot 23 of the blade member 20, and the connecting members 24 are stopped by the sidewall 231 having four undulating sections; as a result, the garden shears is able to provide different stopping positions for different cutting strengths and cutting efficiencies. While the connecting member 24 pushes the blade member 20 to rotate around the bolt 18, the blade 22 moves down towards the cutting slot 141 of the anvil 14 to perform a cutting operation. On the other hand, when the pressing handle member 10 and the gripping member 30 are opened apart from each other, the connecting member 24 is pulled back to the opposite end of the adjusting slot 23 of the blade member 20 to open the blade 22 and the anvil 14 apart from each other. For storage purposes, the engaging member 19 of the pressing handle member 10 is hooked onto the engaging portion 38 of the handle member 30 to keep the blade 22 and the anvil 14 closed together. Please refer to FIG. 7. When the blade member 20 needs to be replaced or sharpened, the connecting member 24 can be removed from the adjusting slot 23, while the bolt 18 locked in the shaft apertures 111, 121 and the first through aperture 21 is disassembled such that the blade member 20 can be directly pulled out of the first slot 15 of the separator 12. Further, by preventing the nut 17 in the limiting slot 123, sandwiched between the pressing handle element 11b and the separator 12, from falling out, it is even more convenient to exchange the blade member 20.

With the above-mentioned structure, the following benefits can be obtained: 1. because the pressing handle member 10 has the pressing handle elements 11a, 11b sandwiching the separator 12 and the blade member 20 pivoted onto one end of the separator 12, and the gripping member 30 uses the handle elements 31a, 31b sandwiching the assembly member 32, the pivot connection between the pressing handle member 10 and the handle member 30 provides a cutting structure with greater structural strength. 2. The pressing handle member 10 and the gripping member 30 rotate around the first pivot apertures 112, 122, and the pressing handle member 10 and the blade member 20 rotate around the shaft apertures 111, 121, such that the cutting stress is not concentrated at a single pivot connection, which can improve the cutting efficiency and reduce the cutting-induced exhaustion.

Although the present invention has been explained in relation to its preferred embodiment, it is to be understood that many other possible modifications and variations can be made without departing from the spirit and scope of the invention as hereinafter claimed.

What is claimed is:

1. A garden shears comprising:
   a pressing handle member having two symmetric pressing handle elements sandwiching a separator such that the pressing handle elements, which extend along substantially an entire length of the pressing handle member, are mounted onto opposite sidewalls of the pressing handle member, the separator and the pressing handle elements each respectively having a shaft aperture and a first pivot aperture at a middle section, and the separator having an anvil formed at one end thereof and a first slot that extends through the separator between at least the anvil and the separator shaft aperture, an enforcing strip formed outside of the anvil on each of the pressing handle elements, a limiting recess with a diameter larger than that of the separator shaft aperture formed in the separator and outside of the shaft aperture, a nut disposed in the limiting recess and sandwiched between the separator and one of the pressing handle elements, wherein a bolt passes through the shaft apertures and engages with the nut;
   a blade member inserted in the first slot of the separator and pivoted onto the bolt disposed through the shaft apertures of the pressing handle member with a first through aperture in the blade member, a blade formed on one end of the blade member and facing towards the anvil, and an adjusting slot formed at another end, two connecting members slidably connected to the adjusting slot, and a connecting aperture formed at one end of each connecting member; and
   a gripping member having two symmetric gripping handle elements sandwiching an assembly member such that the gripping handle elements, which extend along substantially an entire length of the assembly member, are mounted onto opposite sidewalls of the assembly member, one end of each gripping handle element having a second pivot aperture, a pin placed through the second pivot apertures and the first pivot apertures of the pressing handle member, the gripping member further having a second through aperture extending through the gripping handle elements and through the assembly member, the second through aperture disposed inwardly with respect to the second pivot apertures, and a joint placed through the second through aperture and the connecting aperture of each of the connecting members.

2. The garden shears as claimed in claim 1, wherein the pressing handle elements and the separator all have a plurality of assembly apertures, and a plurality of securing pins respectively pass through the assembly apertures to sandwich the separator between the two pressing handle elements.

3. The garden shears as claimed in claim 1, wherein the gripping handle elements and the assembly member all have a plurality of assembly apertures, and a plurality of securing pins respectively pass through the assembly apertures.

4. The garden shears as claimed in claim 1, wherein the assembly member further comprises a containment section disposed adjacent to the second through aperture and an elastic body is disposed in the containment section, and the elastic body pushes against the pressing handle member and is sandwiched between the pressing handle member and the gripping member.

5. The garden shears as claimed in claim 1, wherein the separator and the assembly member are both made of plastic or elastic materials.

6. The garden shears structure as claimed in claim 1, wherein the pressing handle member has an engaging member pivoted onto one end of the separator, an elastic plate sandwiched between the separator and the engaging member, and the assembly member has an engaging portion corresponding to the engaging member such that the engaging member keeps the blade and the anvil closed together.

7. The garden shears as claimed in claim 1, wherein the adjusting slot has a sidewall with at least four undulating portions, such that the connecting members are able to be moved along the undulating portions of the sidewall for positional adjustment.

8. The garden shears as claimed in claim 1, wherein the anvil has a toothed arced surface, and a cutting slot is formed at a center position of the arced surface.

9. The garden shears as claimed in claim 1, wherein the assembly member further comprises a storage space at a side facing the pressing handle member and an oil applicator in the storage space.

* * * * *